United States Patent
Cook et al.

(10) Patent No.: US 10,568,263 B2
(45) Date of Patent: Feb. 25, 2020

(54) LINKAGE ASSEMBLY FOR HEADER HEIGHT CONTROL

(71) Applicant: CNH Industrial America LLC, New Holland, PA (US)

(72) Inventors: Joel Cook, Lititz, PA (US); Sergio Inglat, Curitiba (BR)

(73) Assignee: CNH Industrial America LLC, New Holland, PA (US)

( * ) Notice: Subject to any disclaimer, the term of this patent is extended or adjusted under 35 U.S.C. 154(b) by 109 days.

(21) Appl. No.: 15/842,539

(22) Filed: Dec. 14, 2017

(65) Prior Publication Data

US 2019/0183049 A1    Jun. 20, 2019

(51) Int. Cl.
| | |
|---|---|
| *A01D 41/14* | (2006.01) |
| *A01D 34/24* | (2006.01) |
| *A01D 57/03* | (2006.01) |
| *A01D 43/10* | (2006.01) |
| *F16C 11/04* | (2006.01) |
| *A01D 75/28* | (2006.01) |
| *A01D 34/14* | (2006.01) |

(52) U.S. Cl.
CPC ........... *A01D 41/141* (2013.01); *A01D 34/24* (2013.01); *A01D 43/107* (2013.01); *A01D 57/03* (2013.01); *A01D 34/145* (2013.01); *A01D 75/28* (2013.01); *F16C 11/045* (2013.01)

(58) Field of Classification Search
CPC .... A01D 41/141; A01D 41/14; A01D 75/287; A01D 57/03; A01D 34/24; A01D 43/107; A01D 43/7528; A01D 34/145; F16C 11/045
See application file for complete search history.

(56) References Cited

U.S. PATENT DOCUMENTS

| 3,485,020 | A |   | 12/1969 | Soteropulos et al. |
| 3,728,851 | A | * | 4/1973  | Van Antwerp ....... A01D 41/141 56/208 |
| 4,199,925 | A | * | 4/1980  | Quick .................... A01D 41/14 56/208 |
| 4,206,584 | A | * | 6/1980  | Johnson ................. A01D 41/14 56/15.8 |
| 4,211,057 | A | * | 7/1980  | Dougherty ........... A01D 41/141 56/10.2 E |
| 4,237,680 | A |   | 12/1980 | Hoch et al. |
| 4,312,177 | A |   | 1/1982  | Maier et al. |
| 4,332,126 | A |   | 6/1982  | Van Auwelaer et al. |

(Continued)

FOREIGN PATENT DOCUMENTS

| EP | 2520151 | 9/2016 |
| JP | 5857987 | 2/2016 |

OTHER PUBLICATIONS

Extended European Search Report for EP Application No. 18206270.3 dated May 17, 2019 (six pages).

Primary Examiner — Arpad Fabian-Kovacs
(74) Attorney, Agent, or Firm — Peter K. Zacharias; Patrick M. Sheldrake (57) ABSTRACT

The agricultural harvester comprises a header. The header includes a frame, a control shaft connected to the frame, a flex arm, a linkage assembly and a cutter bar connected to the flex arm. The linkage assembly is movable between a first position and a second position. The linkage assembly includes a first end pivotably connected to the control shaft and a second end connected to the flex arm.

20 Claims, 8 Drawing Sheets (56) References Cited

U.S. PATENT DOCUMENTS

| | | | | |
|---|---|---|---|---|
| 4,441,307 | A | * | 4/1984 | Enzmann ............... A01D 41/14 56/10.2 R |
| 4,641,490 | A | * | 2/1987 | Wynn .................. A01D 41/145 56/10.2 E |
| 4,663,918 | A | | 5/1987 | Williams et al. |
| 4,776,153 | A | * | 10/1988 | DePauw .............. A01D 41/145 56/10.2 E |
| 4,835,954 | A | * | 6/1989 | Enzmann ............... A01D 41/14 56/296 |
| 5,090,184 | A | | 2/1992 | Garter et al. |
| 5,115,628 | A | * | 5/1992 | Garter ................... A01D 46/08 56/10.2 E |
| 6,170,244 | B1 | | 1/2001 | Coers et al. |
| 6,289,659 | B1 | * | 9/2001 | Fox ....................... A01D 46/08 56/10.2 E |
| 7,222,474 | B2 | | 5/2007 | Rayfield et al. |
| 7,730,700 | B2 | | 6/2010 | Nathan et al. |
| 8,151,547 | B2 | | 4/2012 | Bich et al. |
| 8,726,621 | B2 | | 5/2014 | Ritter et al. |
| 8,776,487 | B2 | | 7/2014 | Coers et al. |
| 9,095,093 | B2 | | 8/2015 | Hyronimus et al. |
| 2006/0242935 | A1 | | 11/2006 | Rayfield et al. |
| 2008/0078155 | A1 | | 4/2008 | Coers et al. |
| 2010/0083629 | A1 | * | 4/2010 | Klotzbach ............. A01D 41/14 56/320.1 |
| 2015/0101300 | A1 | | 4/2015 | Pierson |
| 2015/0319920 | A1 | | 11/2015 | Joyce |
| 2016/0014963 | A1 | | 1/2016 | Totten et al. |
| 2016/0255773 | A1 | | 9/2016 | Rayfield et al. |
| 2017/0086366 | A1 | | 3/2017 | Noll |

* cited by examiner

LINKAGE ASSEMBLY FOR HEADER HEIGHT CONTROL

The present disclosure relates generally to a header of a plant cutting machine (e.g., a combine harvester) and, more specifically, to a header height control system for the header.

BACKGROUND OF THE INVENTION

An agricultural harvester, e.g., a plant cutting machine, such as, but not limited to, a combine or a windrower, generally includes a header operable for severing and collecting plant or crop material as the harvester is driven over a crop field. The header has a plant cutting mechanism for severing the plants or crop, such as an elongate sickle mechanism that reciprocates sidewardly relative to a non-reciprocating guard structure or a row unit with gathering chains and deck plates. The header further includes one or more draper belts and/or augers for feeding the cut plants or crop towards a feederhouse located centrally of the header.

To facilitate cutting crop, the header also includes a header height control system. Typical header height control systems have a combination of flex arms and feelers operatively connected to a rotatable control shaft. The flex arms are connected to the cutting mechanism and pivot upwardly as the harvester travels over an uneven terrain so as to enable the cutting mechanism to track the ground. The feelers slidably engage the flex arms and, as the flex arms pivot, rotate the rotatable control shaft. However, this arrangement of feelers, flex arms and control shaft require a specific lockout method, a specific downstop and a specific feeler-flex arm sliding profile, which subjects the flex arm to significant amounts of stress.

BRIEF SUMMARY OF THE INVENTION

In accordance with an exemplary embodiment, the subject disclosure provides a header for an agricultural harvester. The header comprises a frame, a control shaft connected to the frame, a flex arm, a cutter bar connected to the flex arm, and a linkage assembly movable between a first position and a second position. The linkage assembly includes a first end pivotably connected to the control shaft, and a second end connected to the flex arm.

An aspect of the exemplary embodiment is that the linkage assembly further includes a first link having the first end, and a second link having the second end, wherein the second link is pivotably connected to the first link and the second end is pivotably connected to the flex arm. Alternatively, the linkage assembly is a link having the first end, the second end, and an elongated aperture adjacent the second end, wherein the second end is slidably connected to the flex arm.

Another aspect of the exemplary embodiment is that the flex arm is movable between a first height position and a second height position. The control shaft includes a tab positioned to engage the first end of the linkage assembly at one of the first or second positions. The first end of the linkage assembly includes a slot for receiving the tab of the control shaft. The header further comprises a sensor operatively connected to the control shaft for sensing a rotational orientation of the control shaft when the first end of the linkage assembly is between or in one of the first or second positions.

In accordance with another exemplary embodiment, the subject disclosure provides a header for an agricultural harvester. The header comprises a control shaft, a flex arm and a linkage assembly. The linkage assembly includes a first link and a second link. The first link has a first end pivotably connected to the control shaft, and a second end. The second link has a first end pivotably connected to the flex arm, and a second end pivotably connected to the second end of the first link.

An aspect of the exemplary embodiment is that the linkage assembly is movable between a first position and a second position. In the first position, the first end of the first link is adjacent the first end of the second link. In the second position, the first end of the first link is spaced from the first end of the second link. The header further comprises a downstop configured to engage the second link at the second position of the linkage assembly. The header further comprises an aperture in each of the first and second links, wherein the apertures are configured to align with each other and receive a lockout fastener when the linkage assembly is in the first position.

In accordance with another exemplary embodiment, the subject disclosure provides a header for an agricultural harvester. The header comprises a control shaft, a flex arm, a cutter bar connected to the flex arm, and a link. The link has a first end connected to the control shaft, and a second end. The second end has an elongated aperture engaged with the flex arm.

An aspect of the exemplary embodiment is that the flex arm slidably engages the elongated aperture. The flex arm includes a cam that slidably engages the elongated aperture. The first end of the link is pivotably connected to the control shaft and movable between a first position and a second position as the flex arm slidably engages the elongated aperture. The header further comprises a lockout fastener configured to connect the flex arm to a frame of the header. The lockout fastener is a pin configured to be received by a pair of apertures, and the frame includes one of the pair of apertures and the flex arm includes the other of the pair of apertures.

An aspect of the exemplary embodiment is that the elongated aperture is a curved elongated aperture. The link includes a first leg having the first end and a first longitudinal axis, and a second leg having the second end, the elongated aperture and a second longitudinal axis, wherein the longitudinal axes of the first and second legs are angled about 30 to 60 degrees relative to each other, and wherein the elongated aperture extends along or substantially along an entire length of the second leg.

BRIEF DESCRIPTION OF THE SEVERAL VIEWS OF THE DRAWINGS

The foregoing summary, as well as the following detailed description of the exemplary embodiments, will be better understood when read in conjunction with the appended drawings. For purposes of illustration, there are shown in the drawings exemplary embodiments. It should be understood, however, that the exemplary embodiments are not limited to the precise arrangements and instrumentalities shown.

In the drawings.

DETAILED DESCRIPTION OF THE INVENTION

Reference will now be made in detail to the various embodiments illustrated in the accompanying drawings. Wherever possible, the same or like reference numbers will be used throughout the drawings to refer to the same or like features. It should be noted that the drawings are in simplified form and are not drawn to precise scale. Certain terminology is used in the following description for convenience only and is not limiting. Directional terms such as top, bottom, left, right, above, below and diagonal, are used with respect to the accompanying drawings. The term "distal" shall mean away from the center of a body. The term "proximal" shall mean closer towards the center of a body and/or away from the "distal" end. The words "inwardly" and "outwardly" refer to directions toward and away from, respectively, the geometric center of the identified element and designated parts thereof. Such directional terms used in conjunction with the following description of the drawings should not be construed to limit the scope of the subject disclosure in any manner not explicitly set forth. Additionally, the term "a," as used in the specification, means "at least one." The terminology includes the words above specifically mentioned, derivatives thereof, and words of similar import.

The terms "grain," "ear," "stalk," "leaf," and "crop material" are used throughout the specification for convenience and it should be understood that these terms are not intended to be limiting. Thus, "grain" refers to that part of a crop which is harvested and separated from discardable portions of the crop material. The header of the subject disclosure is applicable to a variety of crops, including but not limited to wheat, soybeans and small grains. The terms "debris," "material other than grain," and the like are used interchangeably.

"About" as used herein when referring to a measurable value such as an amount, a temporal duration, and the like, is meant to encompass variations of ±20%, ±10%, ±5%, ±1%, or ±0.1% from the specified value, as such variations are appropriate.

"Substantially" as used herein shall mean considerable in extent, largely but not wholly that which is specified, or an appropriate variation therefrom as is acceptable within the field of art.

Throughout this disclosure, various aspects of the exemplary embodiments can be presented in a range format. It should be understood that the description in range format is merely for convenience and brevity and should not be construed as an inflexible limitation on the scope of the subject disclosure. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 2.7, 3, 4, 5, 5.3, and 6. This applies regardless of the breadth of the range.

Furthermore, the described features, advantages and characteristics of the exemplary embodiments may be combined in any suitable manner in one or more embodiments. One skilled in the relevant art will recognize, in light of the description herein, that the exemplary embodiments can be practiced without one or more of the specific features or advantages of a particular exemplary embodiment. In other instances, additional features and advantages may be recognized in certain embodiments that may not be present in all exemplary embodiments.

Additionally, for convenience purposes only, identical or substantially similar elements of the exemplary embodiments, such as a plurality of flex arms 402A, 402B, 402C, 402D may be described with reference to only one of those elements, such as a flex arm 402A. It is appreciated therefore that the description of one element is equally applicable to the remainder of the same elements. As such, identical elements, or substantially identical elements where so indicated, will be identified, where appropriate, by the same reference numeral, e.g., 402, and distinguished by an alphabetical letter, e.g., A, B, C, D, etc. For example, the flex arm 402A is one of the flex arms, the flex arm 402B is another of the flex arms, the flex arm 402C is yet another of the flex arms, and so forth. Moreover, alternate embodiments of elements, such as the flex arm 402A, may be distinguished by way of a "'", e.g., flex arm 402A', with the understanding that the teachings of the flex arm 402A apply to the flex arm 402A', except where otherwise indicated.

Referring now to the drawings, FIGS. 1-9 illustrate exemplary embodiments of the subject disclosure. For exemplary purposes only, the agricultural harvester is illustrated as a combine harvester 100. The harvester 100 comprises a header 102 and a cab 104 for an operator of the harvester. The header 102 includes a frame 106, 106', 106", a cutter bar 108 and a header height control system 400, 400', 400".

Figure 1:
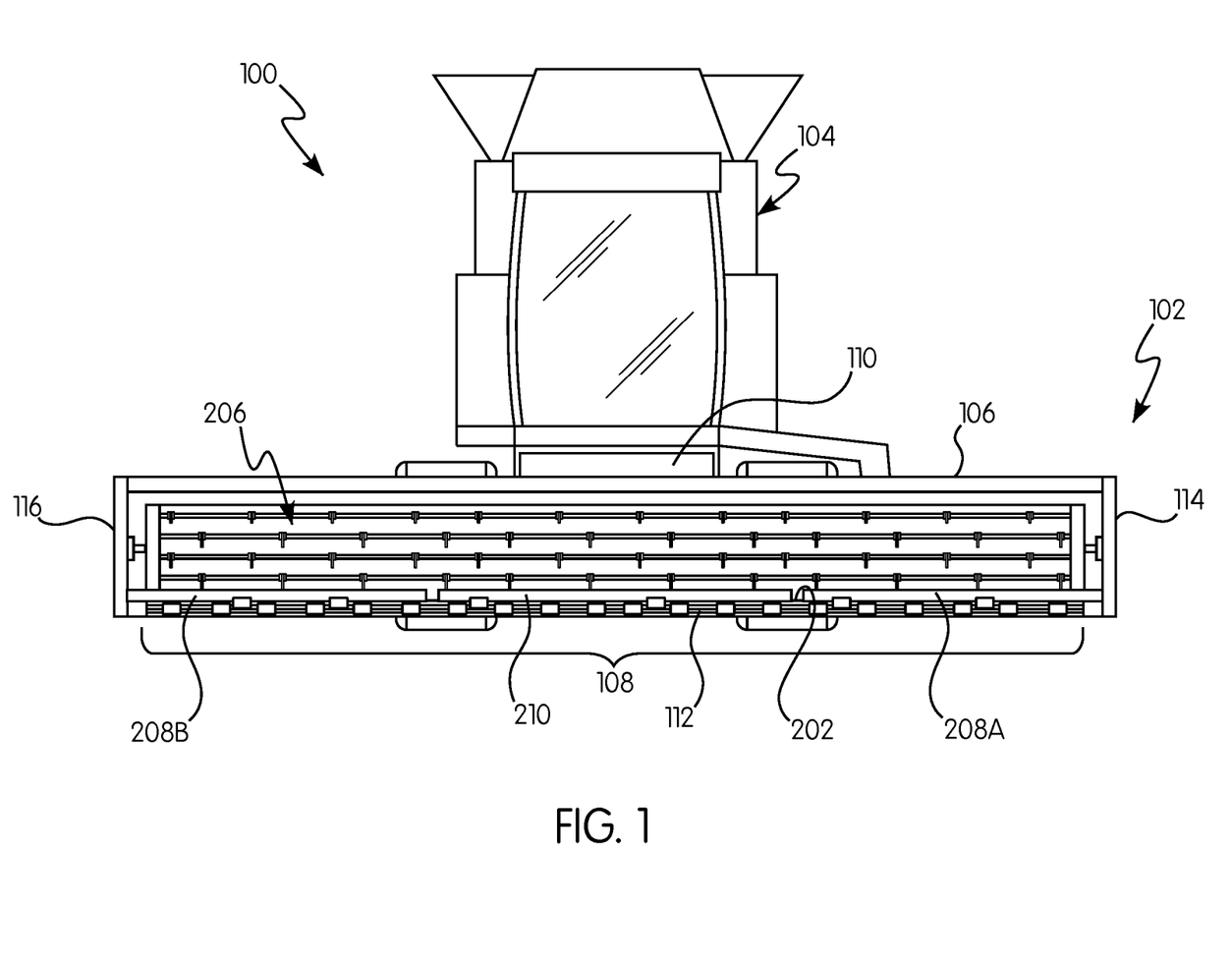
FIG. 1 is a front elevation view of an agricultural harvester including a header in accordance with an exemplary embodiment.
Figure 2:
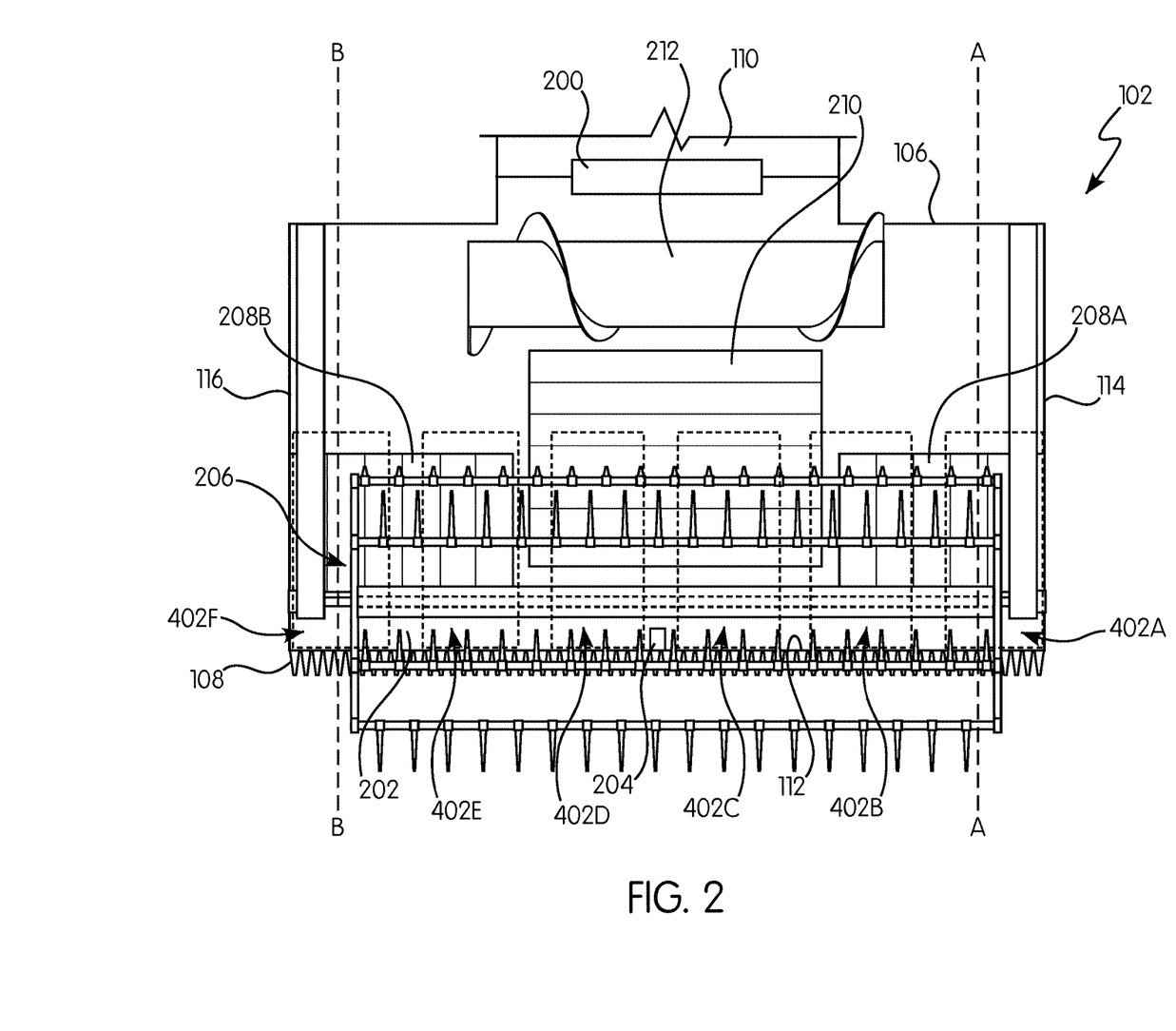
FIG. 2 is a simplified top schematic view of the header of FIG. 1.
Figure 3A:
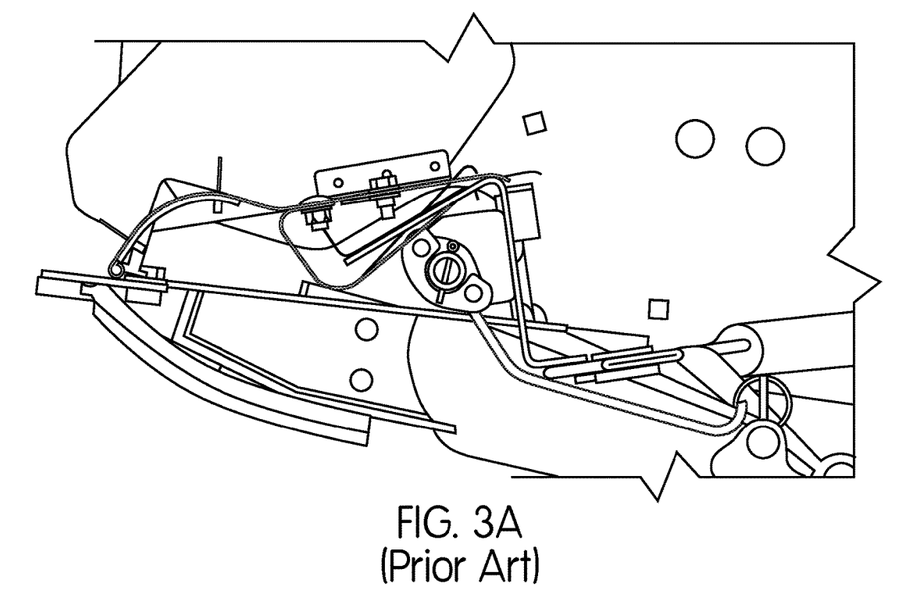
FIG. 3A is a side cross-sectional view along A-A of a typical header height control system in a first position.
Figure 3B:
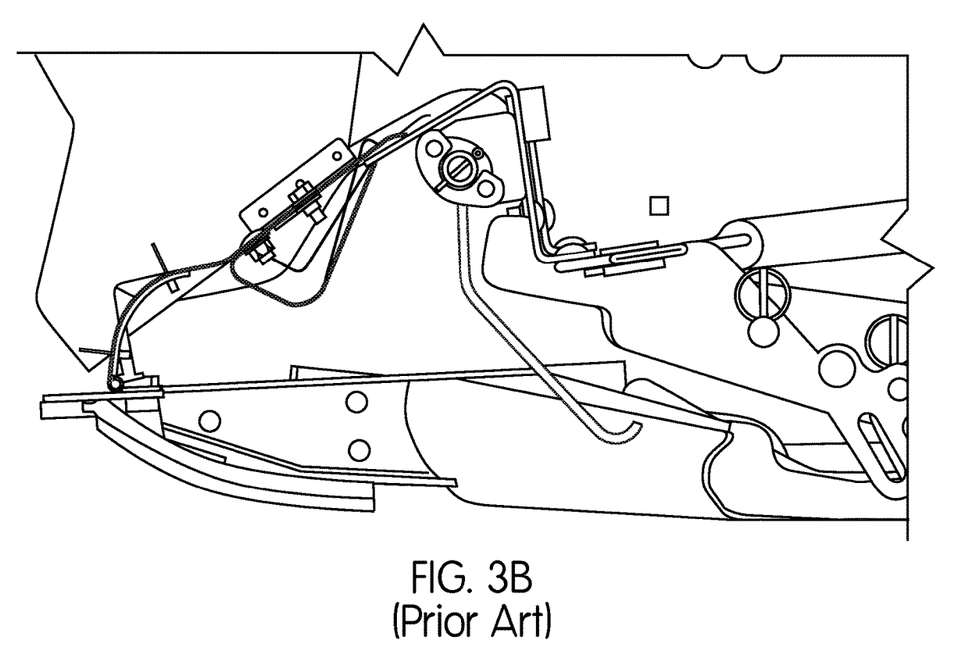
FIG. 3B is the typical header height control system of FIG. 3A in a second position.

Referring now to FIGS. 1 and 2, the frame 106 is the structural chassis of the header 102 and allows for the various components of the header to be attached thereto. The header is attached to a forward end 110 of the harvester 100, and is configured to cut crops, including (without limitation) small grains (e.g., wheat, soybeans, grain, etc.), and to induct the cut crops into a feederhouse 200 as the harvester moves forward over a crop field.

The header 102 includes a floor 202 that is supported in desired proximity to a surface of a crop field and the cutter bar 108. The cutter bar 108 of the header extends transversely along a front end 112 of the floor 202, i.e., in a widthwise direction of the harvester 100, and is bound by a first side edge 114 and an opposing second side edge 116, which are both adjacent to the floor 202. The cutter bar 108 is configured to cut crops in preparation for induction into the feederhouse 200. It is appreciated that the cutter bar includes one or more reciprocating sickles such as those disclosed in U.S. Pat. No. 8,151,547, the entire disclosure of which is incorporated herein by reference for all purposes. Additionally, the cutter bar 108 is operatively connected to a knifedrive 204 for driving the reciprocating sickles. In an exemplary embodiment, the knifedrive 204 is located centrally relative to the cutter bar 108 and frame 106.

An elongated and rotatable harvesting reel assembly 206 extends above and in close proximity to the cutter bar 108. The harvesting reel assembly is configured to cooperate with a plurality of draper belts, such as lateral draper belts 208A, 208B and an infeed draper belt 210, for conveying cut crops to the feederhouse 200. The header 102 may include a rotatable auger 212, e.g., a conveyor screw, to facilitate feeding into the feederhouse 200. Exemplary rotatable harvesting reel assemblies applicable to the subject disclosure are disclosed in U.S. Patent Application Publication No. 2016/0255773 and U.S. Pat. No. 6,170,244, the entire disclosures of which are incorporated herein by reference for all purposes.

The header height control system 400 is operatively connected to the frame 106 and the cutter bar 108. Exemplary embodiments of the header height control system are described herein. While the foregoing aspects of the harvester are being described with respect to the header shown, the header height control system of the subject disclosure can be applied to any other header having use for such a header height control system.

Figure 4A:
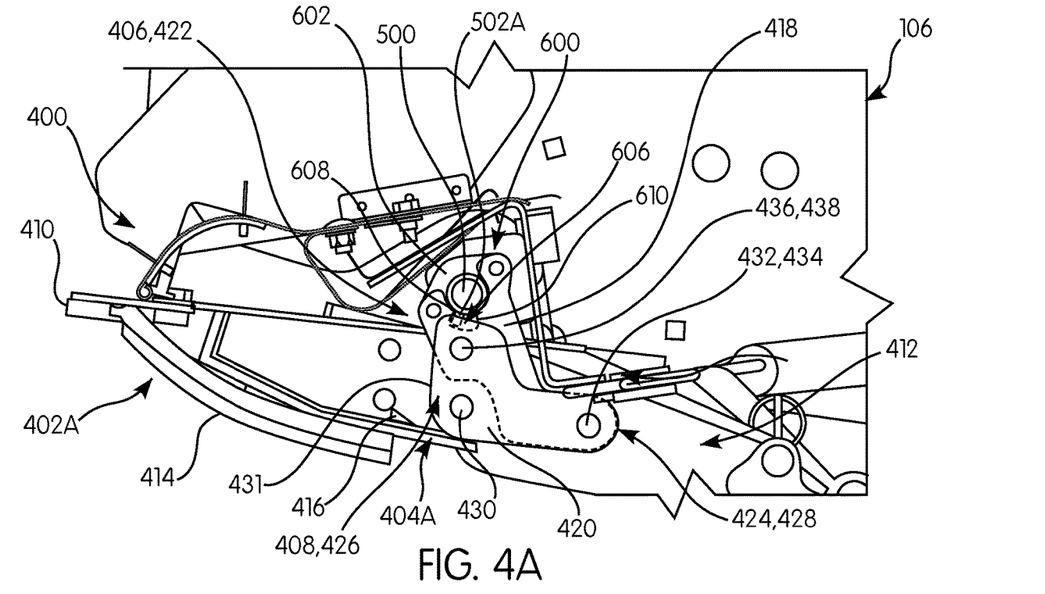
FIG. 4A is a side cross-sectional view taken along A-A of a header height control system in accordance with an exemplary embodiment of the subject disclosure in a first position.

Referring now to FIGS. 1, 2 and 4A-7B, the header height control system 400 is configured substantially as shown. The header height control system includes a control shaft 500 connected to the frame 106, a plurality of flex arms 402A-F connected to the cutter bar 108, and a plurality of linkage assemblies, such as linkage assembly 404A. The linkage assembly 404A is movable between a first position, as shown in FIG. 4A, and a second position, as shown in FIG. 4B, and has a first end 406 pivotably connected to the control shaft 500 and a second end 408 connected to the flex arm 402A.

Figure 5:
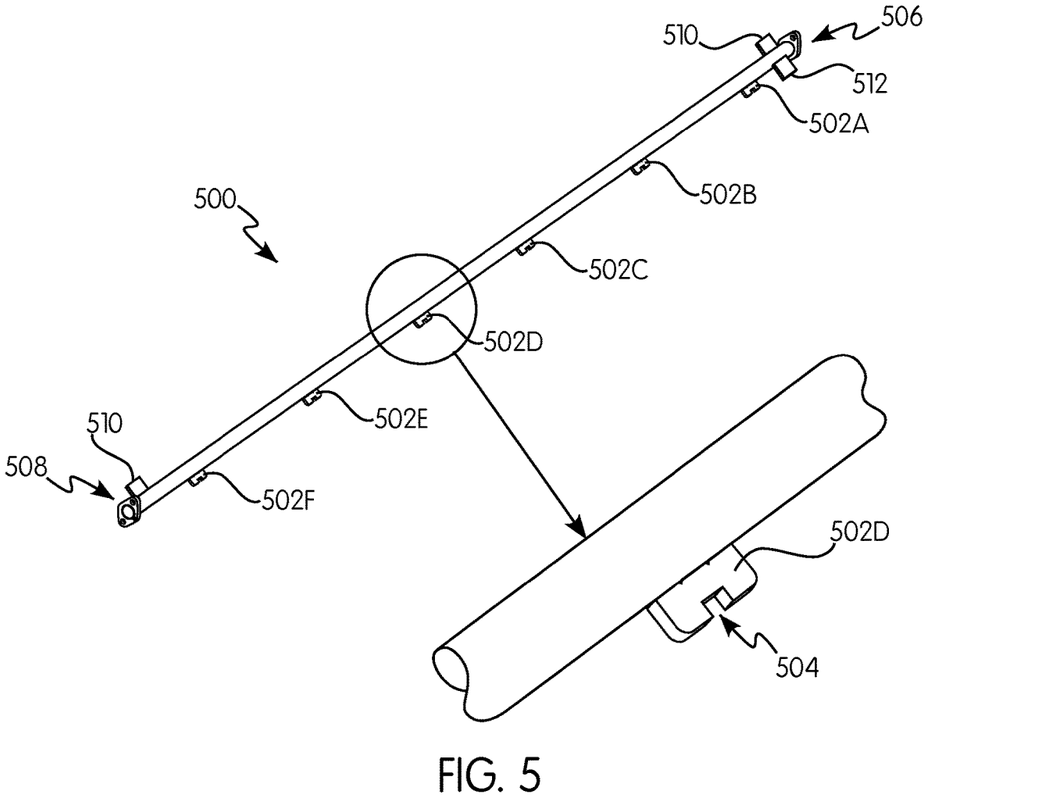
FIG. 5 is a perspective view of a control shaft in accordance with an exemplary embodiment of the subject disclosure.

The control shaft 500 is configured substantially as shown in FIG. 5. The control shaft is an elongated member having tabs 502A-F extending therefrom. In an exemplary embodiment, the control shaft is cylindrical. The tabs 502A-F extend outwardly from the control shaft 500 and each include a notch 504 configured to straddle one of the linkage assemblies, e.g., linkage assembly 404A. In other words, the control shaft includes a tab positioned to engage the first end of the linkage assembly at one of the first or second positions.

Figure 4B:
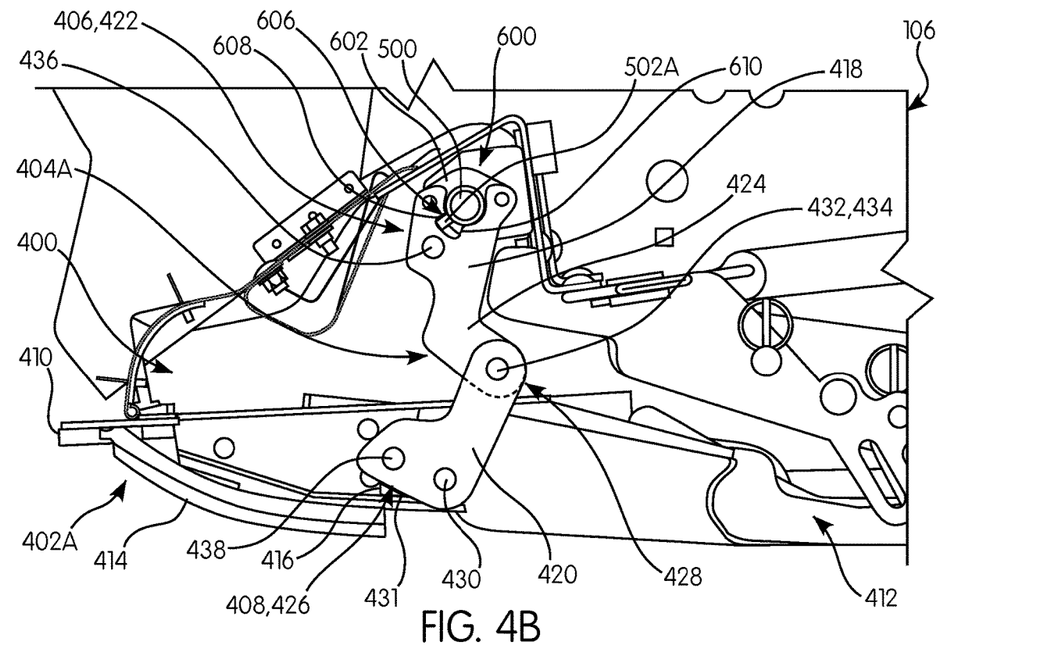
FIG. 4B is the header height control system of FIG. 4A in a second position.

The control shaft 500 includes opposing ends 506, 508 rotatably attached to the side edges 114, 116 of the header 102 such that the control shaft 500 can rotate about its own longitudinal axis. The control shaft 500 is operatively connected to a biasing member 510 that biases the control shaft 500 towards the second position (FIG. 4B). An exemplary biasing member applicable to this disclosure is disclosed in U.S. Patent Application Publication No. 2017/0086366, the entire disclosure of which is incorporated by reference herein for all purposes.

It is appreciated that the control shaft can be divided into any number of segmented control shafts that can be operatively connected to the frame 106. For example, the header 102 may include two parallel or substantially parallel control shafts: one extending from the first side edge 114 towards a center of the header and another extending from the second side edge 116 towards the center of the header.

The flex arm 402A is configured substantially as shown in FIGS. 4A and 4B. The flex arm includes a first end 410, a second end 412 and a bottom 414. The first end 410 is configured to be connectable to the cutter bar 108 via fasteners or other ways known in the art. The second end 412 is configured to be pivotably connectable to the frame 106 via fasteners or other ways known in the art, such that the flex arm 402A can move between a first height position (FIG. 4A) and a second height position (FIG. 4B). The bottom 414 is configured to track a ground surface via, e.g., a skid shoe. Exemplary skid shoes applicable to the subject disclosure are disclosed in U.S. Pat. No. 7,222,474, the entire disclosure of which is incorporated herein by reference for all purposes.

The flex arm 402A can also include a downstop 416. The downstop 416 extends from the flex arm 402A and blocks a rotational path of the linkage assembly, as shown in FIG. 4B. As such, the downstop 416 is configured to stop the linkage assembly 404A from rotating passed a desired position.

Figure 6:
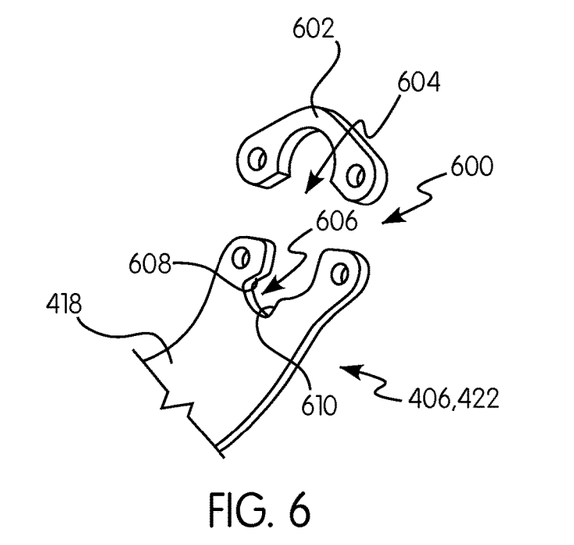
FIG. 6 is a perspective view of a first end of a link in accordance with an exemplary embodiment of the subject disclosure.

The linkage assembly 404A is configured substantially as shown in FIGS. 4A, 4B and 6. The linkage assembly 404A includes a first link 418 and a second link 420 that are each pivotable to move the linkage assembly between the first position (FIG. 4A) and the second position (FIG. 4B). Each of the first and second links 418, 420 include a first end 422, 426 and a second end 424, 428, respectively.

The first end 422 of the first link 418 is configured substantially as shown in FIG. 6. The first end 422 of the first link 418 includes the first end 406 of the linkage assembly 404A. Additionally, the first end 422 further includes a mounting portion 600 for pivotably connecting to the control shaft 500. The mounting portion 600 includes a head 602 attachable to the first end 422. It is appreciated that the mounting portion 600 can further include fasteners and/or bushings for facilitating pivoting motion about the control shaft 500. The first end 422 also includes an opening 604 sized and shaped to receive the control shaft 500, and a slot 606 sized and shaped to receive the tab 502A of the control shaft 500. Additionally, a portion of the first end 422 adjacent to the slot 606 is dimensionally sized to slidably receive the notch 504 of the tab 502A. The slot 606 includes opposing side walls 608, 610 for contacting the tab 502A when the linkage assembly 404A moves between the first and second positions. In other words, the first end of the linkage assembly includes a slot for receiving the tab of the control shaft.

The first end 426 of the second link 420 is configured substantially as shown in FIGS. 4A and 4B. The first end 426 includes the second end 408 of the linkage assembly 404A and a fastener 430 configured to pivotably connect to the flex arm 402A. It is appreciated that the fastener 430 includes appropriate bushings and connectors to facilitate the pivoting connection. Such fasteners are well known in the art and do not necessitate extensive discussion for purposes of this disclosure. In an exemplary embodiment, the fastener 430 is configured as an aperture and pin combination.

Additionally, the first end 426 can further be configured to engage the downstop 416 when the linkage assembly 404A is in the second position (FIG. 4B). Thus, the first end 426 may include an edge 431 for operatively engaging the downstop 416. The edge 431 may be curved, have a groove, have a recessed portion, and so forth. In other words, the header further comprises a downstop configured to engage the second link at the second position of the linkage assembly.

The second ends 424, 428 of the first and second links 418, 420, respectively, are configured substantially as shown in FIGS. 4A and 4B. The second ends 424, 428 each include a fastener 432, 434 for pivotably connecting to one another. Consequently, the first and second links 418, 420 are configured to freely pivot about the fasteners 432, 434. In an exemplary embodiment, the fasteners 432, 434 include apertures configured to receive, e.g., a pin therethrough. It is appreciated that the fasteners 432, 434 further include appropriate bushings and connectors to facilitate the pivoting connection, as is well known in the art.

The first and second links 418, 420 further include a lockout mechanism formed from connecting portions 436, 438 configured to connect to one another. In an exemplary embodiment, the connecting portions 436, 438 are adjacent to the respective first ends 422, 426 of the first and second links 418, 420. Additionally, in an exemplary embodiment, the connecting portions 436, 438 are formed from apertures configured to receive a lockout fastener and align with one another when the linkage assembly 404A is in the first position (FIG. 4A) for simultaneously receiving the lockout fastener. Moreover, when in the first position, the first end of the first link is adjacent the first end of the second link, and when in the second position, the first end of the first link is spaced from the first end of the second link. In other words, the header comprises an aperture in each of the first and second links, wherein the apertures are configured to align with each other and receive a lockout fastener when the linkage assembly is in the first position.

As shown in FIG. 5, the header height control system 400 further includes a sensor 512 configured to sense a rotational position of the control shaft 500. Specifically, the sensor 512 is configured to sense the rotational orientation of the control shaft 500 and, consequently, the rotational orientation of the flex arm, e.g., 402A, rotating the control shaft between and at the first and second positions. In an exemplary embodiment, the sensor 512 is configured to provide a maximum signal at one of the first or second positions, a minimum signal at the other of the first or second positions, and a graduated signal between the first and second positions. For example, the sensor may be configured to provide a signal to the harvester of 1V at the first position, of 4V at the second position, and of 2.5V at a position approximately halfway between the first and second position. An exemplary sensor applicable to this disclosure can be found in U.S. Patent Application Publication No. 2017/0086366, the entire disclosure of which is incorporated herein for all purposes. In other words, the header further comprises a sensor operatively connected to the control shaft for sensing a rotational orientation of the control shaft when the first end of the linkage assembly is between or in one of the first or second positions.

Referring now to FIGS. 1, 2 and 4A-7B, the header 102 is operatively connected to the harvester 100. The control shaft 500 is rotatably connected to the side edges 114, 116 of the frame 106. The flex arms 402A-F are pivotably connected to the frame 106 via the second end 412 and movably connected to the control shaft 500 via the linkage assemblies, such as linkage assembly 404A. Specifically, the first end 422 of the first link 418 is pivotably connected to the control shaft 500 via the mounting portion 600 at one of the tabs 502A-F; the second ends 424, 428 of the first and second links 418, 420 are pivotably connected to one another; and the first end 426 of the second link 420 is pivotably connected to one of the flex arms, such as flex arm 402A. Additionally, the first and second links 418, 420 are connected to each other via the second ends 424, 428 at a position offset from pivoting axes of both the first ends 422, 426 of the first and second links. In other words, the linkage assembly includes a first link having the first end, and a second link having the second end, wherein the second link is pivotably connected to the first link and the second end is pivotably connected to the flex arm. Furthermore, the control shaft 500 is operatively connected to a sensor 512 for sensing the rotational orientation of the control shaft 500. Further, the cutter bar 108 is connected to the first end 410 of the flex arm 402A.

It is appreciated that the header can include varying combinations of flex arms and/or linkage assemblies attached to the one or more control shafts. For example, each flex arm can include more than one linkage assembly that attaches to the control shaft. Additionally, there could be multiple flex arms spaced apart from each other, each attaching to the control shaft via respective linkage assemblies. Furthermore, there could be a set of flex arms that attach to one control shaft and another set of flex arms that attach to a different control shaft.

Figure 7A:
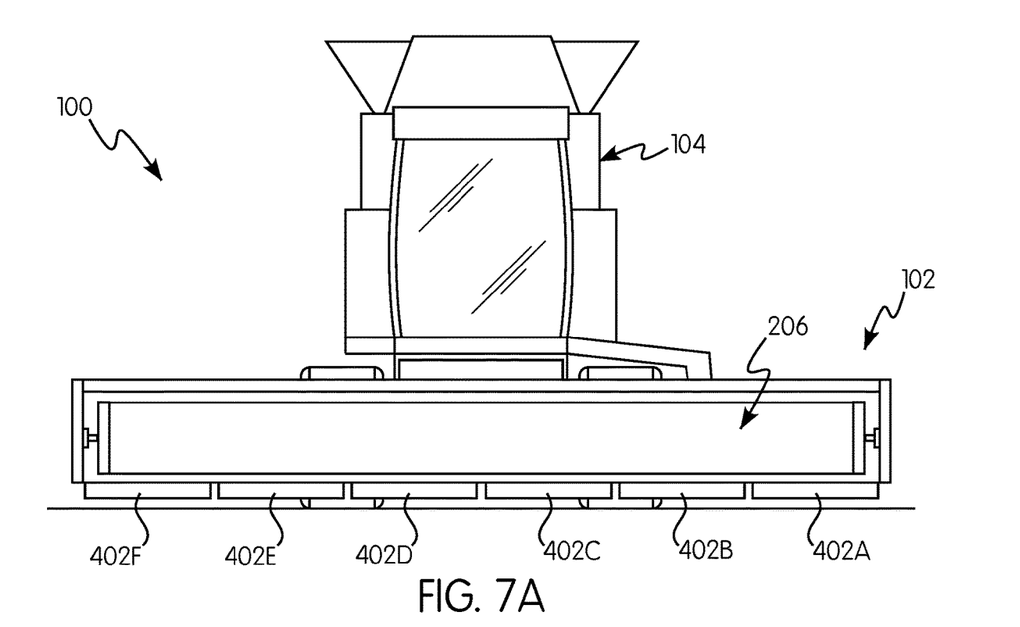
FIG. 7A is a simplified front elevation view of an agricultural harvester including a header in accordance with an exemplary embodiment on even terrain.
Figure 7B:
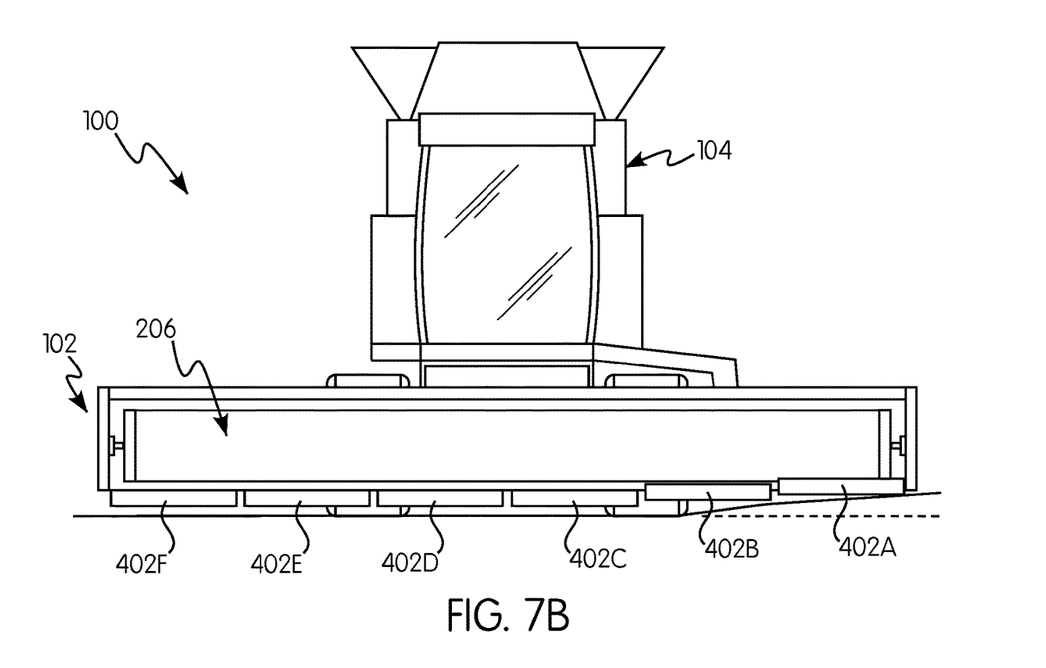
FIG. 7B is a simplified front elevation view of the agricultural harvester of FIG. 7A on uneven terrain.

An exemplary embodiment of the subject disclosure operates by tracking the height position of the flex arms 402A-F that pivot in response to changes in terrain, as shown in FIGS. 7A and 7B. Specifically, the flex arms 402A-F pivot between the first height position (FIG. 4A) and the second height position (FIG. 4B) via the respective linkage assemblies and second ends 412 of the each flex arm. As each flex arm, e.g., flex arm 402A, pivots, the respective linkage assembly, e.g., linkage assembly 404A, moves between the first position (FIG. 4A) and the second position (FIG. 4B).

As the linkage assembly 404A moves between the first and second positions, the first and second links 418, 420 pivot about the control shaft 500 and flex arm 402A in the counter clock wise and clock wise directions, respectively. As the linkage assembly 404A moves to the first position (FIG. 4A), the tab 502A of the control shaft 500 contacts one of the side walls 608, 610 of the first link 418 and rotates the control shaft 500. The rotated control shaft 500 activates the connected sensor 512 and indicates that the flex arm 402A is in the first height position (FIG. 4A). As the linkage assembly 404A moves away from the first position (FIG. 4A) and towards the second position (FIG. 4B), the biasing member 510 of the control shaft 500 rotates the control shaft 500 back towards the second position (FIG. 4B), unless a different flex arm is also in the first position (FIG. 4A) or moves toward the first position. During the transition from the first position to the second position, the sensor 512 generates a varying signal for indicating the position of the respective flex arm. The present arrangement of elements allows for one or more flex arms to be in the second position and another flex arm to be in the first position. As such, when one of flex arm is in the first position or moves towards the first position, that flex arm will rotate the control shaft and activate the sensor.

Additionally, when the linkage assembly 404A is in the first position (FIG. 4A), the first ends 422, 426 of the first and second links 418, 420 are adjacent to each other, which causes the connecting portions 436, 438 to align with one another. Thus, the connecting portions 436, 438 can be engaged together to lock the linkage assembly 404A in the first position. For example, the operator of the header can insert the lockout fastener, e.g., a pin, through a pair of aligned apertures to prevent the first and second links 418, 420 from separating. Conversely, when the linkage assembly 404A is in the second position (FIG. 4B), the first and second links 418, 420 will reach a maximum-extension position, e.g., form a substantially straight line, and stop the flex arm 402A from moving below the second height position (FIG. 4B). Additionally, the downstop 416 can be utilized to further prevent the flex arm 402A from moving below the second height position (FIG. 4B). As such, the edge 431 of the second link's 420 first end 426 engages the downstop 416 and stops the second link 420 from pivoting past the second position. Consequently, the attached flex arm 402A is prevented from extending past the second height position (FIG. 4B).

It is appreciated that the subject disclosure can be modified without departing from the scope of the subject disclosure. For example, FIGS. 8A-9 disclose additional exemplary embodiments in accordance with the subject disclosure.

Figure 8A:
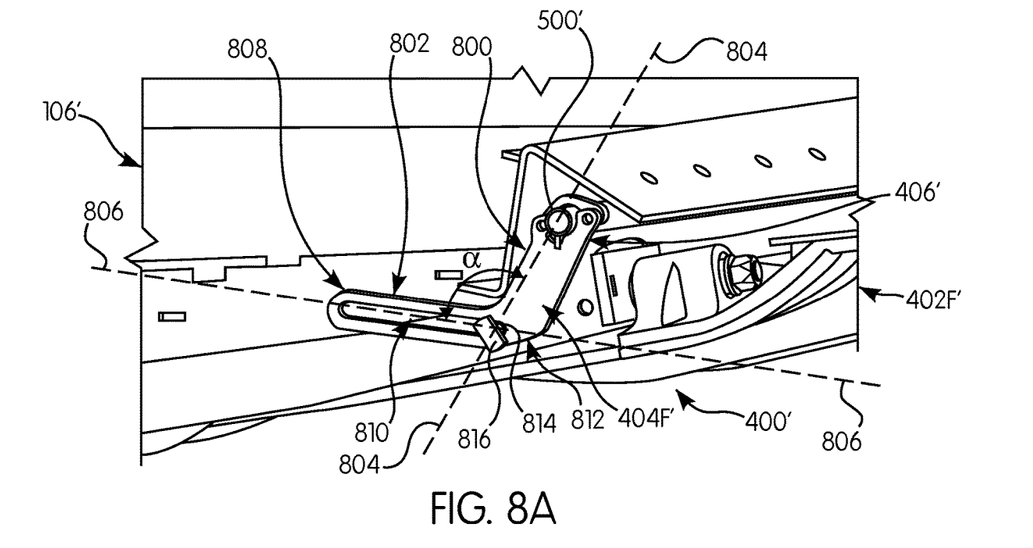
FIG. 8A is a perspective side cross-sectional view taken along B-B of a header height control system in accordance with an exemplary embodiment of the subject disclosure in a first position.
Figure 8B:
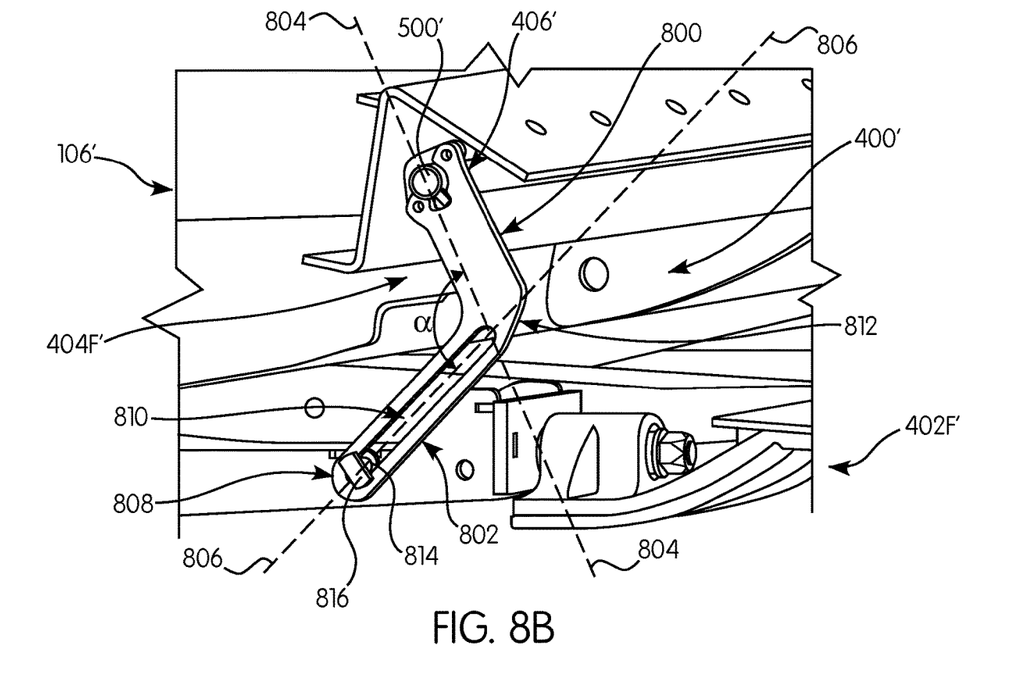
FIG. 8B is the exemplary header height control system of FIG. 8A in a second position.
Figure 9:
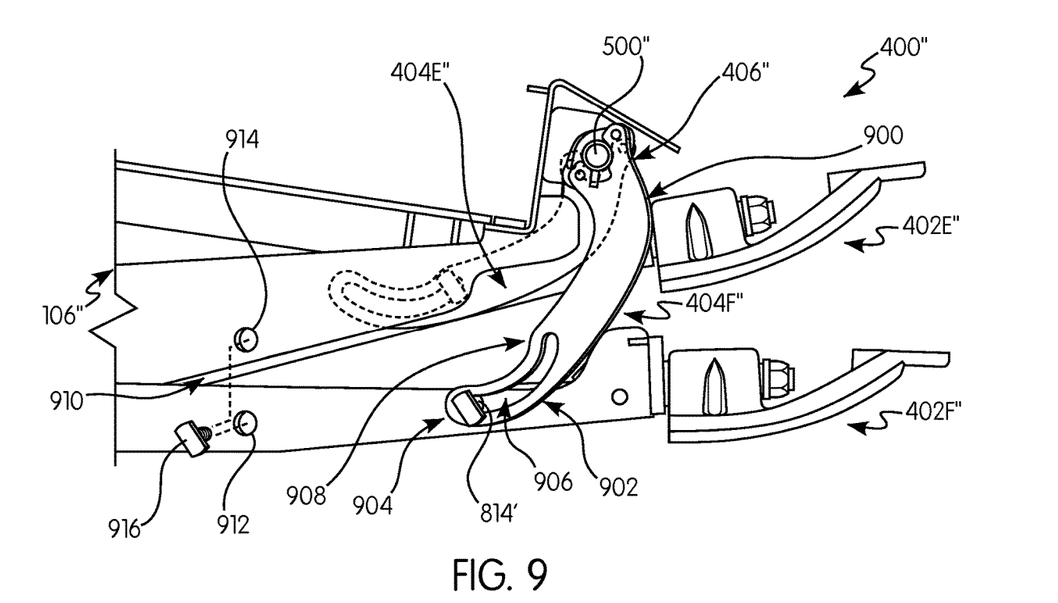
FIG. 9 is a side cross-sectional view taken along B-B of a header height control system in accordance with an exemplary embodiment of the subject disclosure showing two linkage assemblies, each of which are in either a first position or a second position.

Referring now to FIGS. 8A-9, headers having header height control systems, 400', 400" are disclosed. The header height control systems 400', 400" each include a control shaft 500', 500", a plurality of flex arms 402A'-F', 402A"-F", a plurality of linkage assemblies, e.g., linkage assemblies 404F', 404F", and a sensor. It is appreciated that the control shafts 500', 500", flex arms 402A'-F', 402A"-F" and sensors are similar or substantially similar to the control shaft 500, flex arms 402A-F and sensor 512 disclosed above, except where otherwise indicated below.

The linkage assembly 404F' is configured substantially as shown in FIGS. 8A and 8B. The linkage assembly 404F' is movable between a first position (FIG. 8A), and a second position (FIG. 8B), and includes a first leg 800 and a second leg 802.

The first leg 800 defines a first longitudinal axis 804 and includes a first end 406' that is similar or substantially similar to the first end 406 of the linkage assembly 404A. The second leg 802 defines a second longitudinal axis 806 and includes a second end 808 and an elongated aperture 810. In an exemplary embodiment, the first and second longitudinal axes 804, 806 are transverse to each other and form an angle α of about 60°, α being defined as the angle between the first and second legs 800, 802. However, it is appreciated that the angle α can be anywhere from 5° to 85° including 10°, 20°, 30°, 40°, 50°, 60°, 70° and 80°. The linkage assembly 404F' also includes a bend 812 between the first and second legs 802, 804.

In other words, the link includes a first leg having the first end and a first longitudinal axis, and a second leg having the second end, the elongated aperture and a second longitudinal axis, wherein the longitudinal axes of the first and second legs are angled about 30 to 60 degrees relative to each other, and wherein the elongated aperture extends along or substantially along an entire length of the second length.

The second end 808 is a closed end for closing off the elongated aperture 810. The elongated aperture 810 extends from the second end 808 to about the bend 812. The elongated aperture 810 is sized and shaped to receive a cam 814 connected to the flex arm 402A'. In an exemplary embodiment, the cam 814 is a slidable and/or rotatable dowel extending from the flex arm 402F' and through the elongated aperture 810. The cam 814 further includes a cap 816 sized and shaped to have a width larger than a height of the elongated aperture 810. In an exemplary embodiment, the cap 816 is removable from the cam 814. Alternatively, the cap 816 can have a length smaller than the height of the elongated aperture 810 such that when the cap is oriented to align its length with the height of the elongated aperture, the cap can be slid through the elongated aperture.

The linkage assembly 404F" is configured substantially as shown in FIG. 9. The linkage assembly is movable between a first position, as shown by the linkage assembly drawn in phantom lines (404E"), and a second position, as shown by the linkage assembly drawn in solid lines (404F").

The linkage assembly 404F" is similar or substantially similar to the linkage assembly 404F' except as shown, e.g., having a curved body. Specifically, the linkage assembly 404F" includes a first curved leg 900 and a second curved leg 902.

The first curved leg 900 includes a first end 406" that is similar or substantially similar to the first end 406 of the linkage assembly 404A. The second curved leg 902 includes a second end 904 and a curved elongated aperture 906. In other words, the elongated aperture is a curved elongated aperture.

The first and second curved legs 900, 902 meet at a bend 908. The second end 904 is a closed end for closing off the curved elongated aperture 906. The curved elongated aperture 906 extends from the second end 904 to about the bend 908. The curved elongated aperture 906 is sized and shaped to receive a cam 814', which is similar or substantially similar to the cam 814 of the linkage assembly 404F'.

The header height control systems 400', 400" further include lockout mechanisms. FIG. 9 shows a lockout mechanism 910 applicable to both header height control systems 400', 400". The lockout mechanism 910 is configured substantially as shown in FIG. 9.

The lockout mechanism 910 is similar or substantially similar to the lockout mechanism of the first and second links 418, 420. Specifically, the lockout mechanism 910 includes a first connecting portion 912, a second connecting portion 914 and a lockout fastener 916. In an exemplary embodiment, the connecting portions 912, 914 are formed from apertures configured to receive the lockout fastener 916, wherein the apertures are configured to align with one another when the linkage assembly 404F" is in the first position (as shown by linkage assembly 404E") for simultaneously receiving the lockout fastener. In an exemplary embodiment, the first connecting portion 912 is adjacent the flex arm 402F and the second connecting portion 914 is adjacent the frame 106". In other words, the header further comprises a lockout fastener configured to connect the flex arm to a frame of the header. The lockout fastener is a pin configured to be received by a pair of apertures, and the frame includes one of the pair of apertures and the flex arm includes the other of the pair of apertures.

Referring now to FIGS. 8A-9, the header height control systems 400', 400" are interconnected similarly or substantially similarly to how the header height control system 400 is interconnected, except as otherwise indicated below. Specifically, each flex arm 402F', 402F" is respectively slidably connected to the control shaft 500', 500" via the linkage assembly 404F', 404F" and, more specifically, via the elongated aperture 810, 906 and cam 814, 814'. In other words, the flex arm slidably engages with the elongated aperture. Specifically, the flex arm includes a cam that slidably engages the elongated aperture. Moreover, the first end of the link is pivotably connected to the control shaft and movable between a first position and a second position as the flex arm slidably engages the elongated aperture. In sum, the linkage assembly is a link having the first end, the second end, and an elongated aperture adjacent the second end, wherein the second end is slidably connected to the flex arm.

Additionally, each of the header height control systems 400', 400" operate similarly or substantially similarly to how the header height control system 400 operates, except as otherwise indicated below. Specifically, the first and second positions (FIGS. 8A and 8B, and FIG. 9, linkage assemblies 404E" and 404F", respectively) of each linkage assembly (404F', 404F") are achieved via a sliding connection between the flex arm (402F', 402F") and the elongated aperture (810, 906). When the linkage assembly (404F', 404F") is in the first position, the cam (814, 814') is at a point along the elongated aperture (810, 906) closest to the first end (406', 406"). Conversely, when the linkage assembly is in the second position, the cam is at a point along the elongated aperture furthest from the first end. Moreover, the closed end of the second end (808, 904) acts as a downstop to prevent the flex arm (402F', 402F") from pivoting below a second height position (FIGS. 8B and 9, linkage assembly 404F", respectively). Additionally, the operator of the harvester may also engage the lockout mechanism 910 when the flex arm (402F', 402F") is in a first height position (FIGS. 8A and 9, linkage assembly 404E", respectively) to lock the flex arm in the first position.

The advantages of a header having a linkage assembly as disclosed above are apparent. For example, previous designs utilizing feelers, such as those shown in FIGS. 3A and 3B, that are rigidly attached to a rotatable control shaft and that slide along flex arms in response to terrain changes suffer from significant drawbacks. Specifically, such designs require a specific lockout method, a specific downstop, and flex arms having unique surface profiles slidably engaging the feelers thereon. Moreover, such designs often have the lockout method and downstop significantly spaced from the knifedrive, which causes the flex arm to experience significant stresses when the lockout or downstop is engaged. The present disclosure's header height control system replaces feelers with links that reduce the complexity of the design and incorporate locking methods and downstops that, by comparison, reduce stresses on the flex arms.

While the subject disclosure has been described with reference to exemplary embodiments, it will be appreciated by those skilled in the art that various changes may be made and equivalents may be substituted for elements thereof without departing from the scope of the subject disclosure. For example, features described in one embodiment may be incorporated into a different embodiment, such as the use one link verses two links.

In addition, modifications may be made to adapt a particular situation or material to the teachings of the subject disclosure without departing from the essential scope thereof. For example, the various pivoting connections may be formed in other ways known in the art rather than what is explicitly disclosed, or the linkage assembly may have more than two links. It is to be understood, therefore, that the subject disclosure is not limited to the particular aspects disclosed, but it is intended to cover modifications within the spirit and scope of the subject disclosure as defined by the appended claims and discussed above.

We claim:

1. A header for an agricultural harvester comprising:
    a frame;
    a control shaft connected to the frame;
    a flex arm;
    a cutter bar connected to the flex arm; and
    a linkage assembly movable between a first position and a second position, the linkage assembly having:
        a first end pivotably connected to the control shaft,
        a second end connected to the flex arm, and
        a lockout fastener for locking the linkage assembly in the first position.

2. The header of claim 1, wherein the linkage assembly further includes:
    a first link having the first end, and
    a second link having the second end, wherein the second link is pivotably connected to the first link and the second end is pivotably connected to the flex arm.

3. The header of claim 1, wherein the linkage assembly is a link having the first end, the second end, and an elongated aperture adjacent the second end, wherein the second end is slidably connected to the flex arm.

4. The header of claim 1, wherein the flex arm is movable between a first height position and a second height position.

5. The header of claim 1, wherein the control shaft includes a tab positioned to engage the first end of the linkage assembly at one of the first or second positions.

6. The header of claim 5, wherein the first end of the linkage assembly includes a slot for receiving the tab of the control shaft.

7. The header of claim 1, further comprising a sensor operatively connected to the control shaft for sensing a rotational orientation of the control shaft when the first end of the linkage assembly is between or in one of the first or second positions.

8. A header for an agricultural harvester comprising:
    a control shaft;
    a flex arm; and
    a linkage assembly that includes:
        a first link having:
            a first end pivotably connected to the control shaft, and
            a second end, and
        a second link having:
            a first end pivotably connected to the flex arm,
            a second end pivotably connected to the second end of the first link, and
            a lockout fastener for locking the linkage assembly in the first position.

9. The header of claim 8, wherein the linkage assembly is movable between a first position and a second position.

10. The header of claim 9, wherein in the first position the first end of the first link is adjacent the first end of the second link, and wherein in the second position the first end of the first link is spaced from the first end of the second link.

11. The header of claim 9, further comprising a downstop configured to engage the second link at the second position of the linkage assembly.

12. The header of claim 9, further comprising an aperture in each of the first and second links, wherein the apertures are configured to align with each other and receive the lockout fastener when the linkage assembly is in the first position.

13. A header for an agricultural harvester comprising:
    a control shaft;
    a flex arm;
    a cutter bar connected to the flex arm; and
    a link having:
        a first end connected to the control shaft, and
        a second end having an elongated aperture engaged with the flex arm.

14. The header of claim 13, wherein the flex arm slidably engages with the elongated aperture.

15. The header of claim 13, wherein the flex arm includes a cam that slidably engages the elongated aperture.

16. The header of claim 13, wherein the first end of the link is pivotably connected to the control shaft and movable between a first position and a second position as the flex arm slidably engages the elongated aperture.

17. The header of claim 13, further comprising a lockout fastener configured to connect the flex arm to a frame of the header.

18. The header of claim 17, wherein the lockout fastener is a pin configured to be received by a pair of apertures, and wherein the frame includes one of the pair of apertures and the flex arm includes the other of the pair of apertures.

19. The header of claim 13, wherein the elongated aperture is a curved elongated aperture.

20. The header of claim 13, wherein the link includes:
   a first leg having the first end and a first longitudinal axis, and
   a second leg having the second end, the elongated aperture and a second longitudinal axis, wherein the longitudinal axes of the first and second legs are angled about 30 to 60 degrees relative to each other, and wherein the elongated aperture extends substantially along an entire length of the second leg.

* * * * *